(12) United States Patent
Sato

(10) Patent No.: US 11,094,148 B2
(45) Date of Patent: Aug. 17, 2021

(54) DOWNLOADING SYSTEM MEMORY DATA IN RESPONSE TO EVENT DETECTION

(71) Applicant: Micron Technology, Inc., Boise, ID (US)

(72) Inventor: Junichi Sato, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 127 days.

(21) Appl. No.: 16/010,646

(22) Filed: Jun. 18, 2018

(65) Prior Publication Data

US 2019/0385383 A1 Dec. 19, 2019

(51) Int. Cl.
*G07C 5/08* (2006.01)
*G07C 5/00* (2006.01)
*G05D 1/00* (2006.01)

(52) U.S. Cl.
CPC ........... *G07C 5/085* (2013.01); *G05D 1/0088* (2013.01); *G07C 5/008* (2013.01)

(58) Field of Classification Search
CPC .................................................. G07C 5/085
See application file for complete search history.

(56) References Cited

U.S. PATENT DOCUMENTS

| 5,546,579 | A | 8/1996 | Josten et al. |
| 5,815,093 | A | 9/1998 | Kikinis |
| 5,936,315 | A | 8/1999 | Lais |
| 5,956,703 | A * | 9/1999 | Turner .................. G06N 3/063 706/27 |
| 6,345,219 | B1 * | 2/2002 | Klemens ................. B60R 21/01 701/45 |
| 6,629,030 | B2 * | 9/2003 | Klausner ................ G07C 5/085 340/438 |
| 7,190,882 | B2 * | 3/2007 | Gammenthaler .......................... G08B 13/19647 348/143 |
| 7,383,389 | B1 | 6/2008 | Bumbulis |
| 7,653,778 | B2 * | 1/2010 | Merry, Jr. ........... G06F 12/0246 711/103 |
| 7,711,461 | B2 * | 5/2010 | Yokogawa .......... G06F 11/0739 701/31.5 |

(Continued)

FOREIGN PATENT DOCUMENTS

| GB | 2399247 | 9/2004 |
| JP | 2000-128030 | 5/2000 |

(Continued)

OTHER PUBLICATIONS

Bin Yang, Ming Liang, Raquel Urtasun, "HDNET: Exploiting HD Maps for 3D Object Detection", Proceedings of the 2nd Conference on Robot Learning, PMLR 87:146-155, 2018.

(Continued)

*Primary Examiner* — Michael A Berns
(74) *Attorney, Agent, or Firm* — Greenberg Traurig

(57) ABSTRACT

A method includes detecting an event occurring on a vehicle. The vehicle includes at least one computing device that controls at least one operation of the vehicle. The at least one computing device includes a first computing device comprising system memory. In response to detecting the event, data is downloaded from the system memory to a non-volatile memory device of the vehicle. In some cases, a control action for the vehicle is implemented based on analysis of the downloaded data.

16 Claims, 9 Drawing Sheets

(56) References Cited

U.S. PATENT DOCUMENTS

| | | | | |
|---|---|---|---|---|
| 8,010,248 B2* | 8/2011 | Sano | G07C 5/085 | 280/735 |
| 8,060,718 B2* | 11/2011 | Freitas | G06F 12/0246 | 711/105 |
| 8,090,495 B2* | 1/2012 | Fink | G01R 31/007 | 701/33.2 |
| 8,122,185 B2* | 2/2012 | Merry, Jr. | G06F 12/0246 | 711/103 |
| 8,160,764 B2* | 4/2012 | Choi | G08G 1/162 | 701/24 |
| 8,312,207 B2* | 11/2012 | Merry, Jr. | G06F 12/0246 | 711/103 |
| 8,321,084 B2* | 11/2012 | Yamashita | H03M 7/46 | 701/29.1 |
| 8,452,481 B2* | 5/2013 | Ishiko | B60T 17/221 | 701/30.4 |
| 8,527,778 B2* | 9/2013 | Kim | G06F 21/64 | 713/170 |
| 8,531,793 B2* | 9/2013 | Bandic | G11B 5/09 | 360/54 |
| 8,601,202 B1 | 12/2013 | Melcher et al. | | |
| 8,688,915 B2* | 4/2014 | Daly | G06F 12/121 | 711/122 |
| 8,725,312 B2* | 5/2014 | Mori | G07C 5/0808 | 701/1 |
| 8,793,431 B2* | 7/2014 | Bandic | G11B 20/1879 | 711/113 |
| 8,930,625 B2* | 1/2015 | Daly | G06F 12/122 | 711/118 |
| 8,930,668 B2* | 1/2015 | Engle | G06F 3/067 | 711/170 |
| 8,959,280 B2* | 2/2015 | Yu | G06F 3/0608 | 711/103 |
| 8,990,874 B2* | 3/2015 | Huang | H04N 21/234309 | 725/110 |
| 9,298,603 B2* | 3/2016 | Schuette | G06F 12/0246 | |
| 9,365,162 B2* | 6/2016 | Nix | B60W 10/18 | |
| 9,802,541 B2* | 10/2017 | Nix | B60W 30/095 | |
| 10,102,696 B2* | 10/2018 | Iwaasa | B60W 50/08 | |
| 10,214,213 B2* | 2/2019 | Kojima | G07C 5/02 | |
| 10,229,547 B2* | 3/2019 | Isozaki | G07C 5/008 | |
| 10,248,627 B2* | 4/2019 | Yang | G06T 1/0007 | |
| 10,308,181 B2* | 6/2019 | Nix | B60W 50/0098 | |
| 10,318,495 B2* | 6/2019 | Talagala | G06F 11/1471 | |
| 10,319,039 B1 | 6/2019 | Konrardy et al. | | |
| 10,365,835 B2* | 7/2019 | Monteleone | G06F 3/0653 | |
| 10,386,792 B2 | 8/2019 | Blayvas | | |
| 10,423,358 B1 | 9/2019 | Foo | | |
| 10,427,655 B2 | 10/2019 | Nix | | |
| 10,521,976 B2* | 12/2019 | Shin | G07C 5/008 | |
| 10,846,955 B2* | 11/2020 | Golov | H03M 7/70 | |
| 10,878,510 B2 | 12/2020 | Perl et al. | | |
| 10,909,782 B1 | 2/2021 | Natanzon | | |
| 2002/0107619 A1 | 8/2002 | Klausner et al. | | |
| 2002/0131768 A1 | 9/2002 | Gammenthaler | | |
| 2004/0263647 A1 | 12/2004 | Yamaguchi | | |
| 2005/0273218 A1 | 12/2005 | Breed et al. | | |
| 2006/0192658 A1 | 8/2006 | Yamamura | | |
| 2006/0261931 A1 | 11/2006 | Cheng | | |
| 2007/0132773 A1 | 6/2007 | Plante | | |
| 2007/0150644 A1 | 6/2007 | Pinto et al. | | |
| 2007/0208904 A1 | 9/2007 | Hsieh et al. | | |
| 2007/0260811 A1 | 11/2007 | Merry, Jr. et al. | | |
| 2007/0294490 A1 | 12/2007 | Freitas et al. | | |
| 2008/0208533 A1 | 8/2008 | Yokogawa | | |
| 2008/0221751 A1 | 9/2008 | Fink et al. | | |
| 2008/0255723 A1 | 10/2008 | Sano | | |
| 2009/0105902 A1 | 4/2009 | Choi et al. | | |
| 2009/0240392 A1 | 9/2009 | Yamashita et al. | | |
| 2010/0030540 A1* | 2/2010 | Choi | G01S 5/0027 | 703/8 |
| 2010/0060734 A1 | 3/2010 | Chou | | |
| 2010/0223423 A1 | 9/2010 | Sinclair et al. | | |
| 2010/0250061 A1 | 9/2010 | Toyofuku et al. | | |
| 2010/0256867 A1 | 10/2010 | Breuer et al. | | |
| 2010/0332072 A1 | 12/2010 | Ishiko et al. | | |
| 2011/0087893 A1 | 4/2011 | Kim | | |
| 2011/0131364 A1 | 6/2011 | George Gordon | | |
| 2012/0014013 A1 | 1/2012 | Bandic et al. | | |
| 2012/0198335 A1 | 8/2012 | Huang | | |
| 2012/0210021 A1 | 8/2012 | Flynn et al. | | |
| 2012/0254266 A1 | 10/2012 | Printezis et al. | | |
| 2012/0254267 A1 | 10/2012 | Printezis et al. | | |
| 2012/0284587 A1 | 11/2012 | Yu et al. | | |
| 2013/0036282 A1 | 2/2013 | Kawachiya et al. | | |
| 2013/0041522 A1 | 2/2013 | Mori et al. | | |
| 2013/0097369 A1 | 4/2013 | Talagala et al. | | |
| 2013/0124787 A1 | 5/2013 | Schuette | | |
| 2013/0151779 A1 | 6/2013 | Daly et al. | | |
| 2013/0246703 A1 | 9/2013 | Bandic et al. | | |
| 2014/0049646 A1 | 2/2014 | Nix | | |
| 2014/0089264 A1 | 3/2014 | Talagala et al. | | |
| 2014/0136809 A1 | 5/2014 | Engle et al. | | |
| 2014/0215119 A1 | 7/2014 | Fujii | | |
| 2014/0320655 A1 | 10/2014 | Kim | | |
| 2014/0320659 A1 | 10/2014 | Kaneyoshi | | |
| 2015/0347038 A1 | 12/2015 | Monteleone et al. | | |
| 2016/0063776 A1 | 3/2016 | Chronowski et al. | | |
| 2017/0021835 A1 | 1/2017 | Kojima | | |
| 2017/0031906 A1 | 2/2017 | Yang et al. | | |
| 2017/0148237 A1 | 5/2017 | Iwaasa | | |
| 2017/0237937 A1 | 8/2017 | Motohashi et al. | | |
| 2017/0278320 A1 | 9/2017 | Isozaki et al. | | |
| 2018/0007323 A1 | 1/2018 | Botusescu et al. | | |
| 2018/0009330 A1* | 1/2018 | Ricci | G07C 5/008 | |
| 2018/0027680 A1* | 1/2018 | Kumar | G06F 9/505 | 361/807 |
| 2018/0162301 A1 | 6/2018 | Meng et al. | | |
| 2018/0257643 A1 | 9/2018 | Kroop et al. | | |
| 2018/0300816 A1 | 10/2018 | Perl et al. | | |
| 2018/0300964 A1 | 10/2018 | Lakshamanan et al. | | |
| 2019/0080526 A1 | 3/2019 | Shin et al. | | |
| 2019/0111876 A1 | 4/2019 | Siddiqui | | |
| 2019/0146930 A1 | 5/2019 | Verhaeghe et al. | | |
| 2019/0163387 A1 | 5/2019 | Jin et al. | | |
| 2019/0171389 A1 | 6/2019 | Muthiah et al. | | |
| 2019/0197799 A1 | 6/2019 | Zwissler et al. | | |
| 2019/0287319 A1 | 9/2019 | Golov | | |
| 2019/0299860 A1* | 10/2019 | Nix | B60W 30/095 | |
| 2019/0302766 A1 | 10/2019 | Mondello et al. | | |
| 2019/0354838 A1 | 11/2019 | Zhang et al. | | |
| 2019/0371087 A1 | 12/2019 | Shin et al. | | |
| 2020/0089580 A1 | 3/2020 | Paley et al. | | |
| 2020/0111270 A1* | 4/2020 | Sato | B60W 50/0205 | |
| 2020/0118359 A1* | 4/2020 | Sato | H04W 4/40 | |
| 2020/0174677 A1 | 6/2020 | Golov | | |
| 2020/0175787 A1 | 6/2020 | Gortsas | | |
| 2020/0250901 A1 | 8/2020 | Golov | | |
| 2020/0250902 A1 | 8/2020 | Golov | | |
| 2021/0094587 A1 | 4/2021 | Pilly et al. | | |

FOREIGN PATENT DOCUMENTS

| | | |
|---|---|---|
| JP | 2002118643 | 4/2002 |
| JP | 2002293271 A | 10/2002 |
| JP | 2006-127206 | 5/2006 |
| JP | 2007-280407 | 10/2007 |
| KR | 10-2007-0074388 | 7/2007 |
| KR | 20100057253 A | 5/2010 |
| KR | 10-1810539 | 12/2017 |
| WO | 2007037749 | 4/2007 |
| WO | 2008007878 A1 | 1/2018 |
| WO | 2019016114 A1 | 1/2019 |

OTHER PUBLICATIONS

Harsha Vardhan, "HD Maps: New age maps powering autonomous vehicles", https://www.geospatialworld.net/article/nd-maps-autonomous-vehicles/, Sep. 22, 2017.

(56) References Cited

OTHER PUBLICATIONS

Black Box Data Recorder for Autonomous Driving Vehicle, U.S. Appl. No. 15/923,820, filed Mar. 16, 2018, Gil Golov, Docketed New Case—Ready for Examination, Apr. 30, 2018.

Black Box Data Recorder with Artificial Intelligence Processor in Autonomous Driving Vehicle, U.S. Appl. No. 15/938,504, filed Mar. 28, 2018, Antonino Mondello, et al, Docketed New Case—Ready for Examination, May 16, 2018.

Wear Leveling for Non-volatile Memory Using Data Write Counters, U.S. Appl. No. 16/204,811, filed Nov. 29, 2018, Gil Golov, Docketed New Case—Ready for Examination, Jan. 21, 2019.

Data Recorders of Autonomous Vehicles, U.S. Appl. No. 16/263,359, filed Jan. 31, 2019, Gil Golov, Docketed New Case—Ready for Examination, Jun. 26, 2019.

Autonomous Vehicle Data Recorders, U.S. Appl. No. 16/263,403, filed Jan. 31, 2019, Gil Golov, Docketed New Case—Ready for Examination, Jun. 26, 2019.

International Search Report and Written Opinion, PCT/US2019/019562, dated Jun. 3, 2019.

International Search Report and Written Opinion, PCT/US2019/019651, dated Jun. 7, 2019.

Hill, Mark D., "On the Meltdown & Spectre Design Flaws," Computer Sciences Dept., Univ. of Wisconsin-Madison, Feb. 2018, 26 pages.

"Project Zero," https://googleprojectzero.blogspot.com/2018/01/reading-privileged-memory-with-side.htm, posted by Jann Horn Jan. 3, 2018, 50 pages.

"Speculative Execution," https://en.wikipedia.org/wiki/Speculative_execution, printed on Jun. 27, 2018, 4 pages.

"Branch Predictor", https://en.wikipedia.org/wiki/Branch_predictor, printed on Apr. 30, 2018, 12 pages.

International Search Report and Written Opinion, PCT/US2020/015877, dated May 27, 2020.

Extended European Search Report, EP19766799.1, dated May 7, 2021.

\* cited by examiner

DOWNLOADING SYSTEM MEMORY DATA IN RESPONSE TO EVENT DETECTION

RELATED APPLICATIONS

This application is related to U.S. Non-Provisional application Ser. No. 15/923,820, filed 16 Mar. 2018, entitled "BLACK BOX DATA RECORDER FOR AUTONOMOUS DRIVING VEHICLE," by Gil Golov, the entire contents of which application is incorporated by reference as if fully set forth herein.

This application is also related to U.S. Non-Provisional application Ser. No. 15/938,504, filed 28 Mar. 2018, entitled "Black Box Data Recorder with Artificial Intelligence Processor in Autonomous Driving Vehicle," by Mondello et al., the entire contents of which application is incorporated by reference as if fully set forth herein.

FIELD OF THE TECHNOLOGY

At least some embodiments disclosed herein relate to detecting events associated with vehicles in general, and more particularly, but not limited to, storing vehicle data in response to detecting an event involving an autonomous vehicle.

BACKGROUND

Autonomous vehicles typically include many sensors to assist in controlling the autonomous vehicle. In the case of an accident, collision, or near collision involving the vehicle, there may be a benefit from reviewing the sensor data recorded just prior to and/or during the accident to assist in potentially determining the cause of the accident, and/or whether there may have been a vehicle failure.

In the event of a power loss during the accident, vehicle sensor data stored in a volatile memory may be lost. Also, the sensor data collected from an autonomous vehicle is most useful when the data is uncompressed.

Memory systems that store data include storage systems, such as a solid-state drive (SSD), and can include one or more memory components that store data. For example, a memory system can include memory devices such as non-volatile memory devices and volatile memory devices. In general, a host system can utilize a memory system to store data at the memory devices of the memory system and to retrieve data stored at the memory system.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
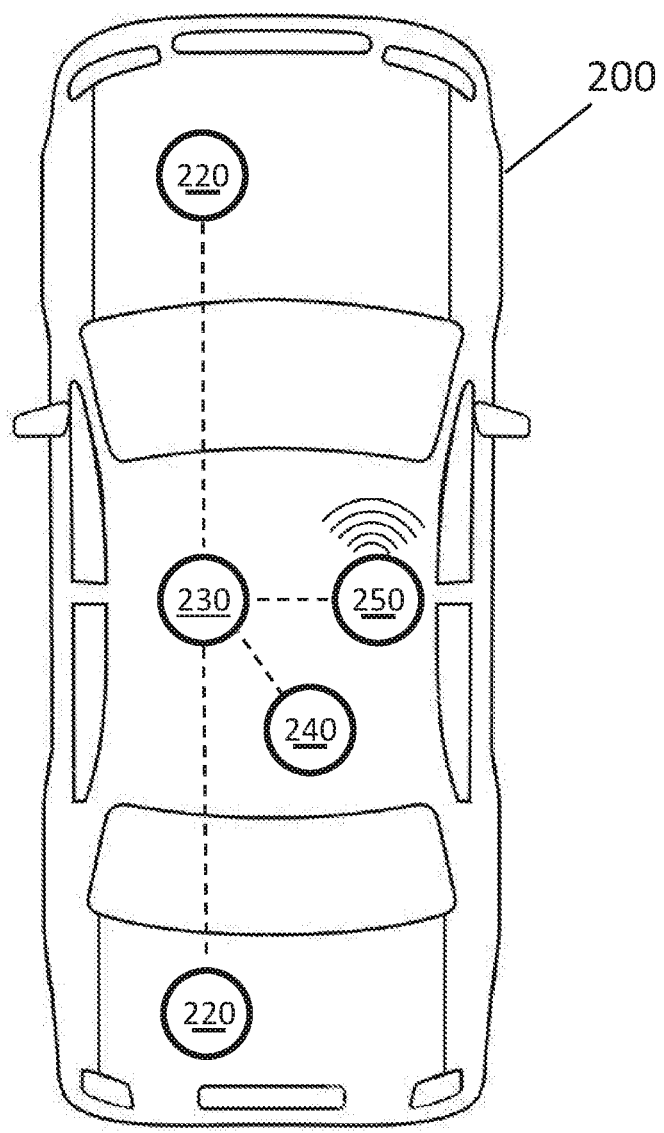
FIG. 1 illustrates a vehicle that collects data using sensors during navigation, according to one embodiment.

Currently, the technology supporting autonomous and other vehicles continues to improve. Improvements in digital camera technology, light detection and ranging (LIDAR), and other technologies have enabled vehicles to navigate roadways independent of drivers or with limited assistance from drivers. In some environments, such as factories, autonomous vehicles operate without any human intervention whatsoever.

While autonomous technology is primarily focused on controlling the movement of vehicles in a traditional sense, little emphasis has been placed on alternative applications that may be implemented on top of these autonomous systems. Indeed, application-level systems generally tend to reinforce existing uses of autonomous systems. For example, experimental uses of autonomous technology have been utilized to perform functions such as returning vehicles to a known location after delivering a passenger or performing refueling of vehicles while not utilized by passengers.

However, these approaches fail to fully utilize the hardware and processing power being implemented in autonomous vehicles, or in other vehicles utilizing automated driver assistance systems. Thus, there currently exists a need in the state of the art of autonomous and other vehicles to provide additional services leveraging the existing hardware installed within such vehicles.

In particular, there is a technical problem of determining a cause for an accident involving an autonomous vehicle. In particular, this technical problem includes determining whether failure or improper design of navigation and/or other software that controls the vehicle is the cause of the accident.

At least some embodiments disclosed herein relate to storing data used by a vehicle prior to an accident (e.g., collision or near-collision). Storage of the data is necessary so that the data can be analyzed after the accident. These embodiments provide a technological solution to the above technical problem by downloading data stored in system memory in response to detecting an event (e.g., an accident has just occurred). The data is analyzed to determine how the software and vehicle operated during the event.

In one embodiment, the system memory data is downloaded to a non-volatile memory device. After downloading, the data is removed from the non-volatile memory device and, for example, analyzed by a server (e.g., a server in the cloud).

In one embodiment, analysis of the downloaded data from the event is used to identify unsafe aspects or design of the software that operates the vehicle. In response to this analysis, control and/or configuration actions can be performed for the vehicle. In some cases, the same or similar control and/or configuration can be performed for other vehicles (e.g., vehicles of the same type and/or using the same or similar software).

In various embodiments, the vehicle can be, for example, any of several types of autonomous vehicle (e.g., a car, truck, aircraft, drone, watercraft, etc.). In one example, an accident may involve a collision with an object (e.g., alien objects that are unsafely positioned on a road). For example, a tree may have unexpectedly fallen on a road due to a recent storm, and the vehicle collides with the tree.

In various embodiments, the downloaded data can be stored by any of several non-volatile memory systems of the vehicle. An example of a memory system is a storage system, such as a solid-state drive (SSD). In some embodiments, the memory system is a hybrid memory/storage system. In general, a vehicle can utilize a memory system that includes one or more memory devices. The memory devices can include media. The media can be non-volatile memory devices, such as, for example, negative-and (NAND). The vehicle (e.g., a host system mounted in the vehicle) can provide write requests to store data at the memory devices of the memory system and can provide read requests to retrieve data stored at the memory system. A memory system can include a controller that manages the memory devices to perform operations such as reading data, writing data, or erasing data and other such operations. A storage system (also hereinafter referred to as storage device) is one example of the memory system.

In one embodiment, an autonomous vehicle rapidly (e.g., in less than 5 seconds after detecting an event) stores all volatile data being used by navigation software of the vehicle at time of detecting a collision involving the vehicle. The stored data is downloaded to a non-volatile memory (NVM) (e.g., 3D XP or an NVDIMM), and is later be analyzed to determine whether the navigation software is at fault, or if there is another cause of the collision.

In one embodiment, a cloud service (sometimes referred to as simply the cloud) is used to receive the downloaded event data from the vehicle and then to analyze the data. For example, when the automatic emergency braking system of a vehicle is activated, event data (e.g., the location) of that braking event is transmitted to, for example, a server or other computing device in the cloud service. The location itself may be determined, for example, based on location data (e.g., geographic coordinates) provided from the vehicle itself (e.g., by a GPS location system) and/or location data otherwise associated with or known about the vehicle. In one embodiment, the cloud searches for a pattern of emergency braking based on the event data. This pattern may be used to make a determination that the software operating the vehicle is not working properly.

In one embodiment, event data received from a vehicle is analyzed. For example, pattern recognition can be used on the received event data. In one case, machine learning is used to recognize patterns or regularities in data. In some cases, a pattern recognition system can be trained from labeled training data (e.g., supervised learning). In other cases, when no labeled data is available, other algorithms can be used to identify previously unknown patterns (e.g., unsupervised learning).

In one embodiment, an event occurring on the vehicle is detected based on a measurement of a brake pedal in a vehicle. For example, the event may be identified based on a foot pressure or extent of movement as compared to a predetermined threshold. In another embodiment, an event is identified based on a rate of deceleration of the vehicle. For example, if a rate of deceleration exceeds a predetermined threshold, then an event (e.g., a near collision) is identified. In another example, the rate of deceleration is observed over a predetermined time period (e.g., the rate is averaged over the time period). In response to detecting this event, system memory data is downloaded.

In one embodiment, in response to analyzing event data, at least one action is performed. For example, a communication can be sent to a current vehicle (e.g., from which the downloaded event data is obtained) to configure software of the vehicle and/or disable one or more functions of the vehicle or software.

In another embodiment, event data is received by a server (e.g., a server of a cloud service) and stored. Data for each event is, for example, received from other vehicles that have previously experienced an event (e.g., the hardware of these other vehicles is used to collect sensor and other data regarding the braking event that occurred during travel). For example, these other vehicles can be vehicles that have previously traveled over the same road that a current vehicle is presently traveling on. By storing data regarding the events (e.g., storing), the current vehicle can be controlled or configured based on analysis of the data.

As mentioned above, event data may include other types of data. For example, data regarding physical objects (e.g., at the time of the collision) detected by vehicles can be sent to a server in a cloud. A map is stored that includes locations for each of these detected objects (e.g., along with other event data). For example, the map can include data collected by the prior vehicles. For example, locations of physical objects can be based on data received from the prior vehicles.

In one embodiment, in response identifying unsafe software (e.g., as determined based on pattern recognition or other analysis of event data), a server can perform one or more actions. For example, the server can send a communication to the current vehicle. In one case, the communication can cause the current vehicle to take corrective actions, such as terminating an autonomous navigation mode, braking, or changing course, or updating firmware of the vehicle (e.g., via an over-the-air firmware update).

In one embodiment, in response to receiving a communication from a server, a current vehicle can switch off its autonomous driving mode, use a backup system, and/or activate a braking system to stop the vehicle.

In another embodiment, the cloud service can send a communication to a server or other computing device that monitors an operating status for other vehicles (e.g., a central monitoring service). For example, the cloud service can send a communication to a server operated by governmental authorities. The communication can, for example, identify that a software component(s) is unsafe. In some cases, in response to a determination that the current vehicle has been in an accident associated with an identified unsafe software, the communication can be sent to the server or other computing device. In such a case, one or more indications provided to the server or other computing device can include data obtained from the current or another vehicle associated with a detected event (e.g., downloaded data stored by the vehicle regarding operating functions and/or state of the vehicle prior to the accident, such as within a predetermined time period prior to the accident).

In one embodiment, the determination whether a vehicle has experienced a braking event and/or been involved in an accident can be based on data from one or more sensors of the vehicle. For example, data from an accelerometer of the vehicle can indicate a rapid deceleration of the vehicle (e.g., deceleration exceeding a threshold). In another case, data can indicate that an emergency system of the vehicle has been activated, such as for example, an airbag, an emergency braking system, etc. In some embodiments, any one and/or a combination of the foregoing events can be deemed to be an event for which downloaded data is transmitted to a server.

In one embodiment, one or more sensors on the current vehicle are used to obtain data regarding braking events and/or objects in the environment of the vehicle as it travels along the route. Data from the sensors and/or data generated based on analysis of sensor data and/or other data can be, for example, transmitted to the cloud service wirelessly (e.g., using a 3G, 4G, or 5G network or other radio-based communication system).

In one embodiment, in response to identifying unsafe software determined based on event data, one or more actions of a vehicle are configured. For example, an over-the-air firmware update can be sent to the vehicle for updating firmware of a computing device of the vehicle (e.g., this update causes the vehicle to avoid identified unsafe functions). In one example, the firmware updates a navigation system of the vehicle. The updated configuration is based at least in part on analysis of data that is collected from other vehicles.

FIG. 1 illustrates an autonomous vehicle 200 that collects data using sensors during navigation, according to one embodiment. For example, autonomous vehicle 200 detects various objects during travel. Vehicle 200 also detects certain events that trigger downloading data (e.g., from system memory) to a non-volatile memory device. In one example, vehicle 200 detects the event that a collision with an object (e.g., another vehicle) has occurred. In response to detecting the collision, a computing system of vehicle 200 causes system memory data to be downloaded to a non-volatile memory device. This is done to permit analysis of the downloaded data after the collision.

More particularly, in one embodiment, FIG. 1 illustrates a sensing system located on board vehicle 200 for collecting information concerning operation of the vehicle. Any of this collected data can be, for example, a portion of the data downloaded from system memory and/or from other volatile memory in response to detecting an event. For example, the sensing system can be used to collect object and event data for sending to a cloud service to be stored for analysis.

The sensing system, in various embodiments, may generally include one or more sensors 220, a processor 230, memory 240, and a communication device (e.g., transmitter 250). Other data in addition to object data can be collected for sending to the cloud service.

The sensing system, in various embodiments, may include one or more sensors 220 configured to collect information regarding operational aspects of autonomous vehicle 200, such as speed, vehicle speed, vehicle acceleration, braking force, braking deceleration, and the like. Representative sensors configured to collect information concerning operational driving characteristics may include, without limitation, tachometers like vehicle speed sensors or wheel speed sensor, brake pressure sensors, fuel flow sensors, steering angle sensors, and the like.

The sensing system, in various embodiments, may additionally or alternatively include one or more sensors 220 configured to collect information regarding the static environment in which autonomous vehicle 200 is operated, such as the presence and content of physical objects surrounding the vehicle. The physical objects include, for example, signage and traffic signals (e.g., stop signs, construction zones, speed limit signs, stop lights), road lane dividers (e.g., solid and dashed lane lines), and the like. Representative sensors configured to collect such static operating environment information may include outward-facing cameras positioned and oriented such that their respective fields of view can capture the respective information each is configured to collect. For example, a camera configured to capture surrounding signage may be configured towards the front of or on top of autonomous vehicle 200 and oriented forward-facing (e.g., straight ahead or perhaps canted sideways by up to about 45 degrees) so as to capture roadside and overhead signage/traffic signals within its field of view as autonomous vehicle 200 travels forward.

As another example, cameras configured to capture road lane dividers may be positioned on the side of or off a front/rear quarter of autonomous vehicle 200 and may be oriented somewhat downwards so as to capture road lane dividers on both sides of vehicle autonomous 200. Additional representative sensors for collecting static operating environment information may include receivers configured to receive wireless signals from base stations or other transmitters communicating information that may ordinarily be found on signage or otherwise related to the static operating environment of autonomous vehicle 200. Likewise, global positioning system (GPS) or other location-related sensors may be utilized to collect information regarding the static environment in which vehicle 200 is operated, such as what street autonomous vehicle 200 is driving on, whether that street is a traffic artery (e.g., highway) or other type, and whether that location is in an urban or rural area.

The sensing system, in various embodiments, may additionally or alternatively include one or more sensors 220 configured to collect information regarding the dynamic environment in which autonomous vehicle 200 is operated, such as information concerning the presence of moving objects such as, for example, other nearby vehicles (e.g., along with such vehicle's location, direction of travel, rate of speed, and rate of acceleration/deceleration), as well as similar information concerning the presence of nearby pedestrians. Representative sensors configured to collect such dynamic operating environment information may include outward-facing cameras positioned and oriented such that their respective fields of view can capture the respective information each is configured to collect. For example, outward-facing cameras may be positioned about the perimeter of autonomous vehicle 200 (e.g., on the front, rear, top, sides, and/or quarters) to capture imagery to which image processing techniques such as vehicle recognition algorithms may be applied. Additionally or alternatively, one or more optical sensors (e.g., LIDAR, infrared), sonic sensors (e.g., sonar, ultrasonic), or similar detection sensors may be positioned about the vehicle for measuring dynamic operating environment information such as distance, relative velocity, relative acceleration, and similar characteristics of the motion of nearby piloted or autonomous vehicles.

The sensing system, in various embodiments, may leverage as sensor(s) 220 those sensors typically found in most autonomous vehicles such as, without limitation, those configured for measuring speed, RPMs, fuel consumption rate, and other characteristics of the vehicle's operation, as well as those configured for detecting the presence of other vehicles or obstacles proximate the vehicle. Sensors 220 may additionally or alternatively comprise aftermarket sensors installed on autonomous vehicle 200 for facilitating the collection of additional information related to driving style.

The sensing system of vehicle 200, in various embodiments, may further comprise an onboard processor 230, onboard memory 240, and an onboard transmitter 250. Generally speaking, in various embodiments, processor 230 may be configured to execute instructions stored on memory 240 for processing information collected by sensor(s) 200 for subsequent transmission offboard vehicle 200. Onboard processor 230, in various embodiments, may additionally or alternatively be configured to execute instructions stored on memory 240 for processing information from two or more sensors 220 to produce further information concerning object characteristics detected by autonomous vehicle 200. For example, in an embodiment, processor 230 may process operational characteristics, such as braking deceleration, alongside dynamic environment characteristics, such as following distance, to avoid debris or an animal suddenly appearing in the roadway. It should be recognized that this is merely an illustrative example, and that one of ordinary skill in the art will recognize further ways sensor data may be processed by a processor to produce further information concerning objects detected by autonomous vehicle 200.

Processor 230, in various embodiments, may be configured to pre-process information from sensor(s) 220 for subsequent offboard transmission via transmitter 250. Pre-processing activities may include one or a combination of filtering, organizing, and packaging the information from sensors 220 into formats and communications protocols for efficient wireless transmission. In such embodiments, the pre-processed information may then be transmitted offboard vehicle 200 by transmitter 250 in real-time or at periodic intervals, where it may be received by nearby piloted or autonomous vehicles and/or a remote server. It should be appreciated that transmitter 250 may utilize short-range wireless signals (e.g., Wi-Fi, BlueTooth) when configured to transmit the pre-processed information directly to nearby piloted or autonomous vehicles, and that transmitter 250 may utilize longer-range signals (e.g., cellular, satellite) when transmitting the pre-processed information directly to the remote server, according to various embodiments later described.

In some embodiments, transmitter 250 may additionally or alternatively be configured to form a local mesh network (not shown) for sharing information with multiple nearby piloted or autonomous vehicles, and then to the remote server via a wide area network access point. Transmitter 250 may of course use any wireless communications signal type and protocol suitable for transmitting the pre-processed information offboard vehicle 200 and to nearby piloted or autonomous vehicles and/or the remote server.

Like sensor(s) 220, in various embodiments, processor 230 and/or onboard transmitter 250 may be integrally installed in vehicle 200 (e.g., car computer, connected vehicles), while in other embodiments, processor 230 and/or transmitter 250 may be added as an aftermarket feature.

Figure 2:
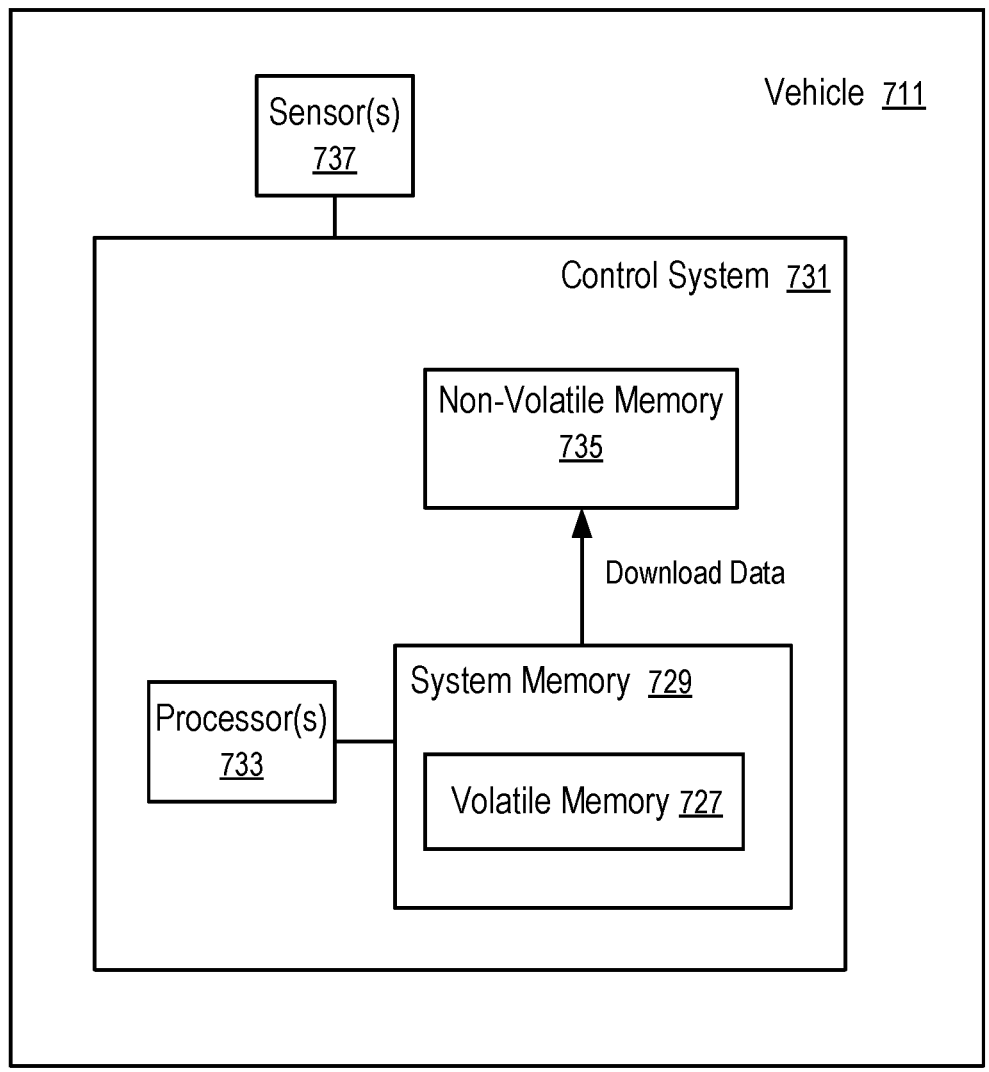
FIG. 2 illustrates a system for downloading data in response to detecting an event associated with a vehicle, according to one embodiment.

FIG. 2 illustrates a control system 731 used to download data in response to detecting an event associated with a vehicle 711, according to one embodiment. Vehicle 711 includes sensors 737. Control system 731 also controls at least one operation (e.g. navigation and/or braking) of the vehicle. The control system 731 includes one or more processors 733, non-volatile memory 735, and system memory 729, which includes volatile memory 727. System memory 729 may also include, for example, data of vehicle 711 stored in other volatile memory devices (not shown).

The volatile memory 727 may be, for example, a dynamic random access memory device. Volatile memory 727 is used to store data used by software during operation of the vehicle such as sensor data and data regarding the operational state of the control system 731. The sensor data is collected, for example, by sensors 737.

Non-volatile memory 735 is used to store data from the volatile memory 727 after an event is detected. Examples of non-volatile memory 735 include 3D XPoint memory and NAND flash memory, as well as removable memory devices such as solid state disks.

The vehicle 711 uses sensors 737 and control system 731 to detect various events, as mentioned above. These events can include, for example, the collision of vehicle 711 with an object. Other events may be detection of a system activity such as emergency braking system activation or sensor data exceeding a threshold. When an event is detected, data stored in volatile memory 727 is downloaded to non-volatile memory 735. Examples of the stored data includes sensor data such as data regarding acceleration, vehicle speed and braking status, LIDAR and video input, location data and control system status such as a program counter indicating operational state of the software executing during the event. In some embodiments, after an event is detected by control system 731, downloading of volatile data to non-volatile data is performed within a specific time duration (e.g. less than five to ten seconds).

In one embodiment, the control system 731 of vehicle 711 may be configured to extract event data from the non-volatile memory and analyze that data. The event data is extracted after being downloaded following detection of an event. For example, the event data can be transmitted wirelessly to a central server that monitors the travel and operation of vehicle 711.

In one embodiment, only a predetermined portion of system memory 729 is downloaded. Processor 733 can determine after detection of an event the predetermined portion to be downloaded. In another embodiment, data from system memory 729 can be downloaded portion by portion in an order based on priority of data. The priority may be determined by a type of event detected by control system 731.

In one embodiment, analysis of event data to determine software operation includes software tracing. Functions of the software occurring at the time of the event are identified. Functions of the software are emulated using the event data. For example, steps performed by the software during the accident are duplicated in order to identify the cause of an accident. Software can be, for example, executed in an emulator for this purpose. Other forms of simulation can be used to analyze the software. Also, backward stepping and backward debugging can be used as part of the analysis of the software.

In one embodiment, data is downloaded to a single non-volatile memory device. In other embodiments, various portions of data can be downloaded to different memory devices.

Figure 3:
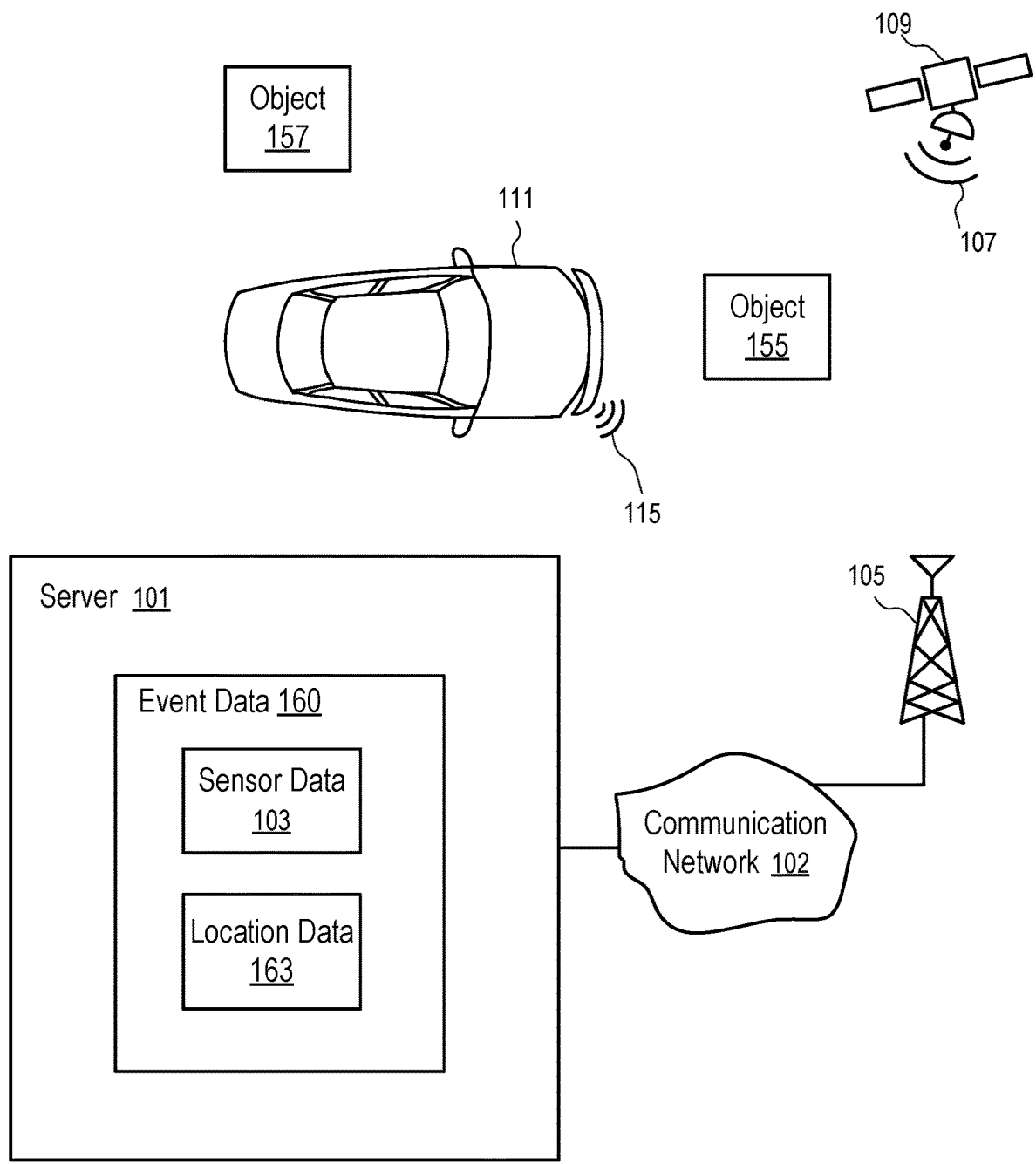
FIG. 3 illustrates a system to analyze event data received from a vehicle, according to one embodiment.

FIG. 3 illustrates a system to analyze event data received from a vehicle 111, according to one embodiment. In one example, if a collision of vehicle 111 and object 155 is detected, event data 160 (e.g., stored in volatile memory 727 of FIG. 2) is downloaded from system memory 729 to non-volatile memory 735. Event data 160 can include data such as sensor data 103 (obtained from sensors of vehicle 111), location data 163, data related to activation of an emergency braking system, or data output from an artificial neural network. During operation, vehicle 711 collects data regarding objects that are detected such as object 155 and object 157.

The event data 160 is extracted from the non-volatile memory and communicated through a wireless communication network 102 to a server 101. Server 101 analyzes the event data 160 to determine a cause of the collision (e.g., software failure). For example, server 101 can use emulation to determine whether software executing on the vehicle 111 functioned properly. Server 101 can select the type of event data 160 (e.g. sensor data or control system status) to be downloaded for analysis. One example of wireless communication network 102 is a cell phone network.

In one example, server 101 can use the event data 160 from vehicle 111 to emulate vehicle 111 software operation using pre-event and post-event data to analyze the event and one or more operations of vehicle 111.

In one embodiment, data regarding events occurring on vehicle 111 is received by server 101 via communication network 102. The received data includes a location for each of the events. For example, the received data can include location data 163 for each event detected. Event data 160 can include data such as, for example, an identifier, a type of braking event, etc. The received event data can be stored in memory of server 101.

In some embodiments, additional data is received by server 101 from the vehicles. This can include, for example, data regarding detected objects. This additional data can be stored as part of event data 160.

The event data received from the vehicle 111 by server 101 is analyzed. For example, this analysis can include pattern recognition or other data analysis (e.g., determining a correlation of event data to other data).

In response to identifying a failure of software, at least one action is performed. For example, server 101 can transmit a communication to vehicle 111 that causes the vehicle to re-configure software.

In one example, a vehicle may communicate, via a wireless connection 115 to an access point (or base station) 105, with the server 101 to submit event data. The wireless connection 115 may be made via a wireless local area network, a cellular communications network, and/or a communication link 107 to a satellite 109 or a communication balloon.

Optionally, the vehicle 111 has a self-learning capability. After an extended period on the road, the vehicle 111 may have its software re-configured. In one example, the centralized server 101 may be operated by a factory, a producer or maker of the vehicles 111, . . . , 113, or a vendor of the autonomous driving and/or advanced driver assistance system for vehicles 111, . . . , 113.

Figure 4:
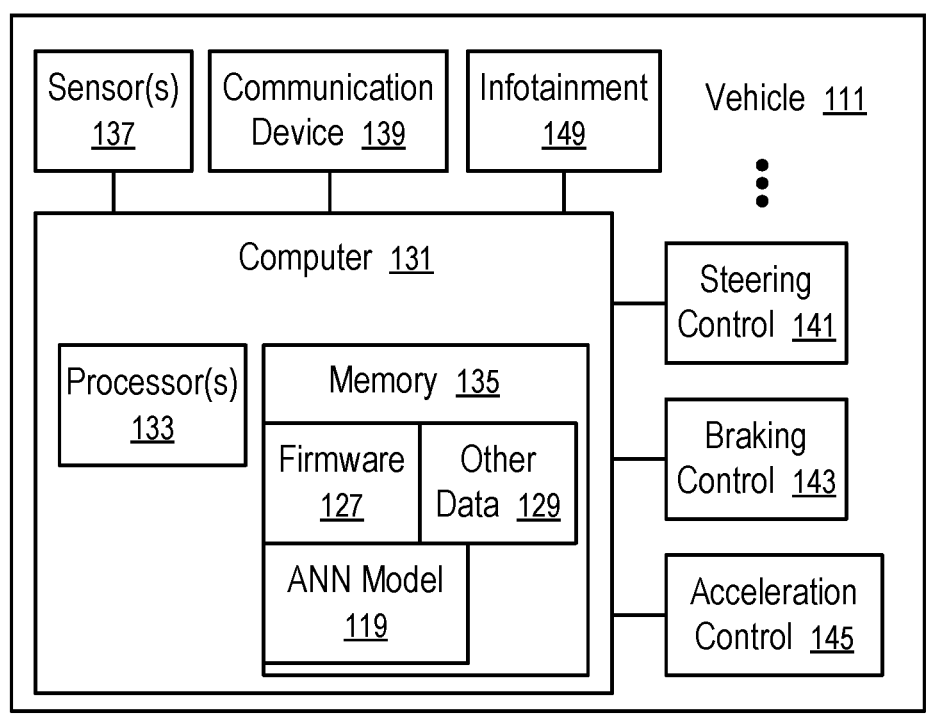
FIG. 4 shows an example of a vehicle configured using an Artificial Neural Network (ANN) model, according to one embodiment.

FIG. 4 shows an example of vehicle 111 as configured using an Artificial Neural Network (ANN) model, according to one embodiment. The vehicle 111 includes an infotainment system 149, a communication device 139, one or more sensors 137, and a computer 131 that is connected to some controls of the vehicle 111, such as a steering control 141 for the direction of the vehicle 111, a braking control 143 for stopping of the vehicle 111, an acceleration control 145 for the speed of the vehicle 111, etc. In some embodiments, vehicle 711 of FIG. 2 has a similar configuration and/or similar components.

The computer 131 of the vehicle 111 includes one or more processors 133, memory 135 storing firmware (or software) 127, the ANN model 119, and other data 129.

In one example, firmware 127 is updated by an over-the-air update in response to a communication from server 101 sent in response to identifying faulty software. Alternatively, and/or additionally, other firmware of various computing devices or systems of vehicle 111 can be updated.

The one or more sensors 137 may include a visible light camera, an infrared camera, a LIDAR, RADAR, or sonar system, and/or peripheral sensors, which are configured to provide sensor input to the computer 131. A module of the firmware (or software) 127 executed in the processor(s) 133 applies the sensor input to an ANN defined by the model 119 to generate an output that identifies or classifies an event or object captured in the sensor input, such as an image or video clip. Data from this identification and/or classification can be included in event data sent from a vehicle to server 101 as discussed above.

Alternatively, and/or additionally, the identification of unsafe software can be used by an autonomous driving module of the firmware (or software) 127 to generate a response. The response may be a command to activate and/or adjust one of the vehicle controls 141, 143, and 145. In one embodiment, the response is an action performed by the vehicle where the action has been configured based on an update command from server 101 (e.g., the update command can be generated by server 101 in response to determining that software of vehicle 111 is faulty based on analysis of event data). In one embodiment, prior to generating the control response, the vehicle is configured. In one embodiment, the configuration of the vehicle is performed by updating firmware of vehicle 111. In one embodiment, the configuration of the vehicle includes updating of the computer model stored in vehicle 111 (e.g., ANN model 119).

In one embodiment, the server 101 stores received sensor input as part of sensor data for the subsequent further training or updating of the ANN model 119 using the supervised training module 117. When an updated version of the ANN model 119 is available in the server 101, the vehicle 111 may use the communication device 139 to download the updated ANN model 119 for installation in the memory 135 and/or for the replacement of the previously installed ANN model 119. These actions may be performed in response to determining that vehicle 111 is failing to properly detect objects and/or in response to identifying unsafe software.

In one example, the outputs of the ANN model 119 can be used to control (e.g., 141, 143, 145) the acceleration of a vehicle (e.g., 111), the speed of the vehicle 111, and/or the direction of the vehicle 111, during autonomous driving.

In one example, data obtained from a sensor of a vehicle may be an image that captures an object using a camera that images using lights visible to human eyes, or a camera that images using infrared lights, or a sonar, radar, or LIDAR system. In one embodiment, image data obtained from at least one sensor of the vehicle is part of the collected data from the vehicle that is analyzed. In some instances, the ANN model is configured for a particular vehicle based on the sensor and other collected data.

Figure 5:
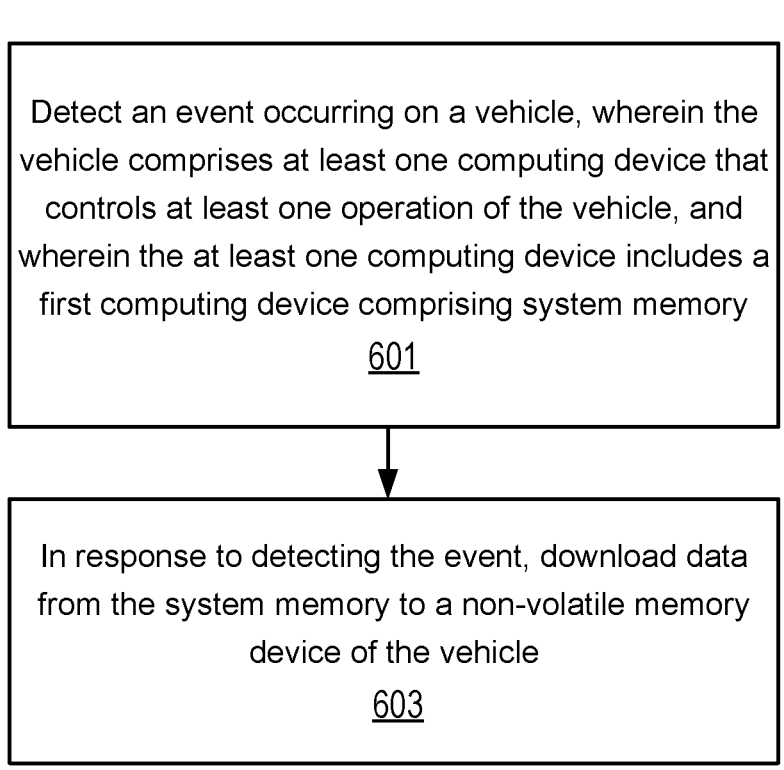
FIG. 5 shows a method to download data from system memory to non-volatile memory of a vehicle in response to detecting an event, according to one embodiment.

FIG. 5 shows a method to download data from system memory to non-volatile memory of a vehicle (e.g., vehicle 200, 711, or 111) in response to detecting an event, according to one embodiment. In block 601, an event occurring on the vehicle is detected. For example, the event is a collision of the vehicle with another vehicle. The vehicle includes at least one computing device that controls at least one operation of the vehicle. One of the computing devices of the vehicle includes the system memory (e.g., uses data stored in system memory 729).

In block 603, in response to detecting the event, data is downloaded from the system memory to a non-volatile memory device. For example, sensor data is downloaded from volatile memory 727 to non-volatile memory 735.

In one embodiment, a method for an autonomous vehicle includes: detecting an event occurring on the vehicle, wherein the vehicle comprises at least one computing device that controls at least one operation of the vehicle, and wherein the at least one computing device includes a first computing device comprising system memory; and in response to detecting the event, downloading data from the system memory to a non-volatile memory device of the vehicle.

In one embodiment, the event is a collision of the vehicle with an object.

In one embodiment, detecting the event comprises at least one of: receiving first data from at least one sensor of the vehicle, and comparing the first data to a threshold; detecting activation of an emergency braking system of the vehicle; or analyzing an output from an artificial neural network.

In one embodiment, the method further comprises analyzing, by a second computing device, the downloaded data.

In one embodiment, the method further comprises: extracting, by a third computing device, the downloaded data from the non-volatile memory device; and sending, over a wireless network, the extracted data to the second computing device for analysis.

In one embodiment, first data used by software executing on the first computing device resides in the system memory, and analyzing the downloaded data comprises analyzing, based on the first data, a function of the software related to the at least one operation of the vehicle. In one embodiment, the software controls navigation of the vehicle.

In one embodiment, the system memory includes a volatile memory device that stores the data prior to downloading the data from the system memory to the non-volatile memory device. In one embodiment, the data is downloaded to the non-volatile memory device in less than 10 seconds after detecting the event.

In one embodiment, the first computing device is a controller, and the non-volatile memory device is a cross point memory device.

In one embodiment, an autonomous vehicle comprises: at least one sensor configured to collect sensor data; a volatile memory device to store data used by software during operation of the vehicle; a non-volatile memory device configured to receive data from the volatile memory device; at least one computing device configured to control at least one operation of the vehicle; and memory storing instructions configured to instruct the at least one computing device to: detect, based on at least a portion of the sensor data, an event associated with operation of the vehicle; and in response to detecting the event, download first data from the volatile memory device to the non-volatile memory device.

In one embodiment, downloading the first data from the volatile memory device to the non-volatile memory device is completed in less than five seconds after detecting the event.

In one embodiment, the data used by the software during operation of the vehicle is stored in system memory of the at least one computing device, and wherein the first data comprises at least one of: at least a portion of the data used by the software during operation of the vehicle; or the portion of the sensor data.

In one embodiment, the volatile memory device is a dynamic random access memory device.

In one embodiment, the non-volatile memory device is configured to provide the first data to a first computing device configured to analyze the first data.

In one embodiment, the at least one computing device includes a first computing device executing the software prior to detecting the event, and wherein after detecting the event, the software is analyzed by emulating the event using the first data.

Figure 6:
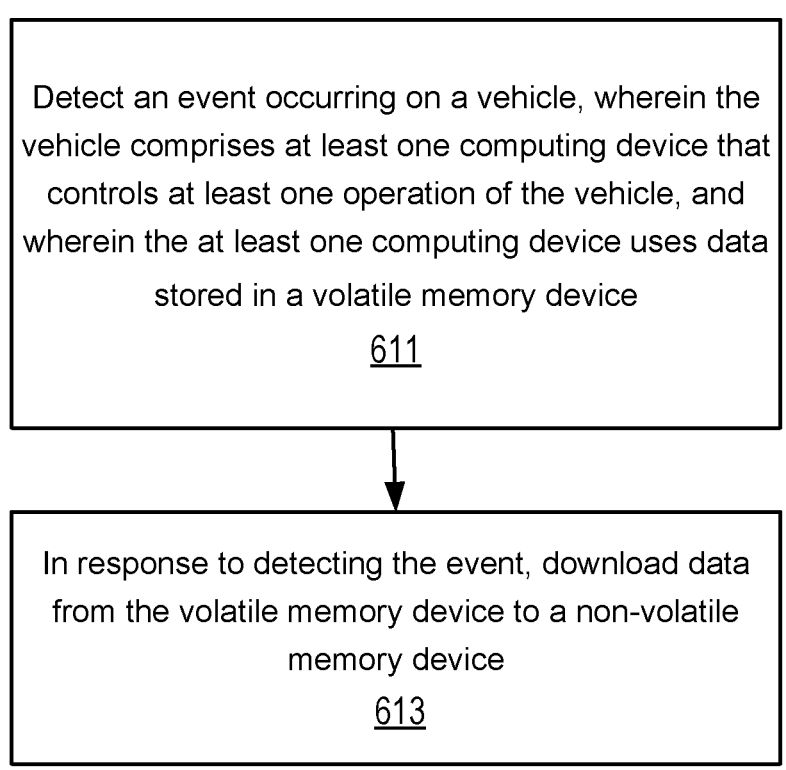
FIG. 6 shows a method to download data from a volatile memory device in response to detecting an event associated with a vehicle, according to one embodiment.

FIG. 6 shows a method to download data from a volatile memory device in response to detecting an event associated with a vehicle (e.g., vehicle 200, 711, or 111), according to one embodiment. In block 611, an event occurring on the vehicle is detected. The vehicle includes one or more computing devices. Each of the computer devices controls, for example, at least one operation of the vehicle. The one or more computer devices use data that is stored in a volatile memory device.

In block 613, in response to detecting the event, data is downloaded from the volatile memory device to a non-volatile memory device. In some embodiments, one or more software components that are executed by the one or more computer devices can also be downloaded to the non-volatile memory device.

In one embodiment, a non-transitory computer storage medium stores instructions which, when executed on a computing device, cause the computing device to perform a method for an autonomous vehicle, the method comprising: detecting an event occurring on the vehicle, wherein the vehicle comprises at least one computing device that controls at least one operation of the vehicle, and wherein the at least one computing device uses data stored in a volatile memory device; and in response to detecting the event, downloading first data from the volatile memory device to a non-volatile memory device.

In one embodiment, the first data includes a program counter that indicates an operational state of software executing on the at least one computing device when the event is detected.

In one embodiment, the method further comprises analyzing, based on the first data, at least one function of software executing on the at least one computing device at the time of detecting the event.

In one embodiment, the method further comprises, in response to detecting the event, selecting a type of data to download, wherein the first data comprises data of the selected type.

Figure 7:
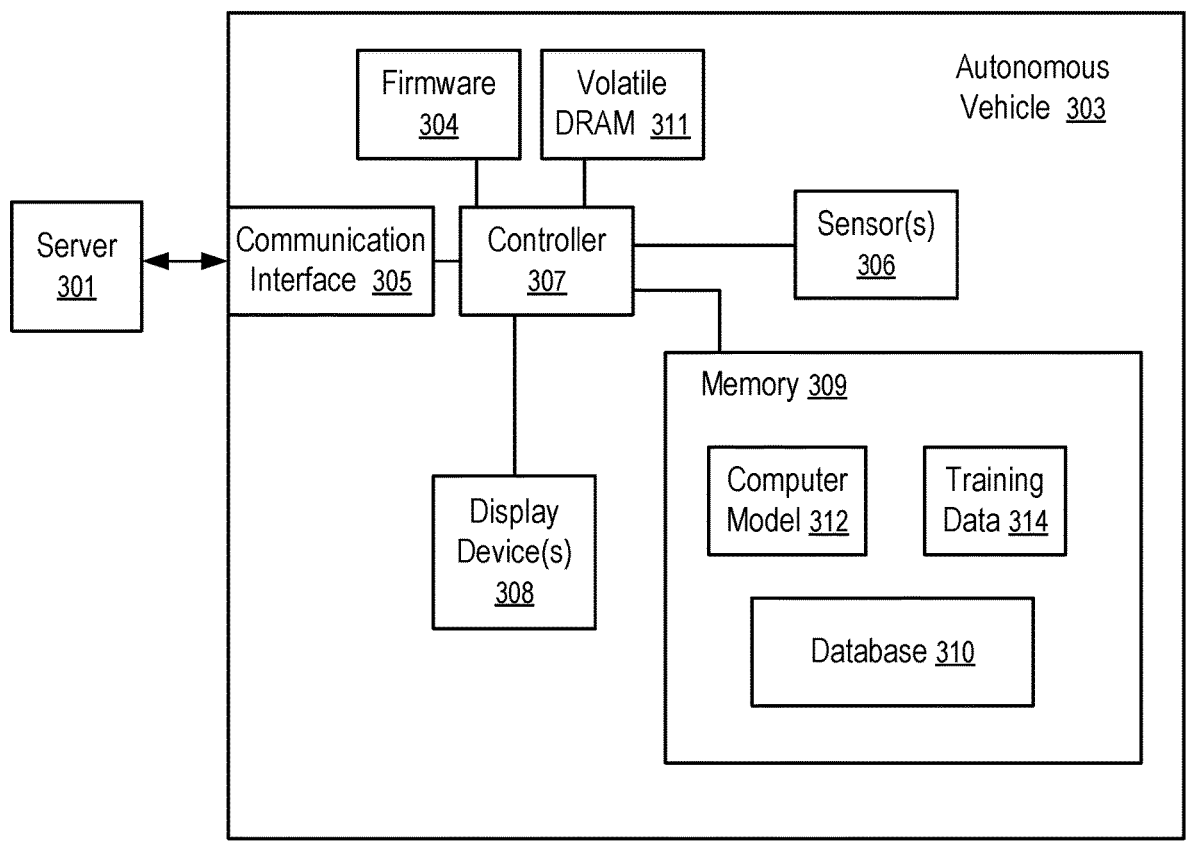
FIG. 7 shows an autonomous vehicle controlled and/or configured in response to an analysis of data downloaded from system memory of a vehicle involved in a collision, according to one embodiment.

FIG. 7 shows an autonomous vehicle 303 controlled and/or configured in response to an analysis of data downloaded from system memory of a vehicle involved in a collision, according to one embodiment. A system of vehicle 303 controls a display device 308 or other device, system, or component of an autonomous vehicle 303. For example, a controller 307 controls the display of images on one or more display devices 308. Controller 307 also controls navigation of the vehicle (e.g. using braking control 143 of FIG. 4).

Server 301 may store, for example, event data 160. Server 301 may determine, using event data 160, that software of vehicle 303 is operating improperly (e.g., failing to detect objects). In response to this determination, server 301 may cause the controller 307 to terminate an autonomous navigation mode. Other actions can be performed in response to this determination including, for example, configuring a vehicle 303 by updating firmware 304, updating computer model 312, updating data in database 310, and/or updating training data 314.

The controller 307 may receive data collected by one or more sensors 306. The sensors 306 may be, for example, mounted in the autonomous vehicle 303. The sensors 306 may include, for example, a camera, a microphone, a motion detector, and/or a camera. At least a portion of the sensors may provide data associated with objects newly detected by vehicle 303 during travel.

The sensors 306 may provide various types of data for collection by the controller 307. For example, the collected data may include image data from the camera and/or audio data from the microphone.

In one embodiment, the controller 307 analyzes the collected data from the sensors 306. The analysis of the collected data includes providing some or all of the collected data as one or more inputs to a computer model 312. The computer model 312 can be, for example, an artificial neural network trained by deep learning. In one example, the computer model is a machine learning model that is trained using training data 314. The computer model 312 and/or the training data 314 can be stored, for example, in memory 309. An output from the computer model 312 can be transmitted to server 301 as part of object data for comparison to map data 160.

In one embodiment, memory 309 stores a database 310, which may include data collected by sensors 306 and/or data received by a communication interface 305 from computing device, such as, for example, a server 301. In one example, this communication may be used to wirelessly transmit collected data from the sensors 306 to the server 301. The received data may include configuration, training, and other data used to configure control of the display devices 308 or other components by controller 307. The received data may also be used to update a configuration of a machine learning model stored in memory 309 as computer model 312.

In FIG. 7, firmware 304 controls, for example, the operations of the controller 307 in controlling the display devices 308 and other components of vehicle 303. The controller 307 also can, for example, run the firmware 304 to perform operations responsive to communications from the server 301. The autonomous vehicle 303 includes volatile Dynamic Random-Access Memory (DRAM) 311 for the storage of run-time data and instructions used by the controller 307. The run-time data and/or instructions can be part of the data downloaded in response to detecting an event.

In one embodiment, memory 309 is implemented using various memory/storage technologies, such as NAND gate based flash memory, phase-change memory (PCM), magnetic memory (MRAM), resistive random-access memory, and 3D XPoint, such that the memory 309 is non-volatile and can retain data stored therein without power for days, months, and/or years.

In one embodiment server 301 communicates with the communication interface 305 via a communication channel. In one embodiment, the server 301 can be a computer having one or more Central Processing Units (CPUs) to which vehicles, such as the autonomous vehicle 303, may be connected using a computer network. For example, in some implementations, the communication channel between the server 301 and the communication interface 305 includes a computer network, such as a local area network, a wireless local area network, a cellular communications network, or a broadband high-speed always-connected wireless communication connection (e.g., a current or future generation of mobile network link).

In one embodiment, the controller 307 performs data intensive, in-memory processing using data and/or instructions organized in memory 309 or otherwise organized in the autonomous vehicle 303. For example, the controller 307 can perform a real-time analysis of a set of data collected and/or stored in the autonomous vehicle 303. In some embodiments, the set of data further includes collected or configuration update data obtained from server 301.

At least some embodiments of the systems and methods disclosed herein can be implemented using computer instructions executed by the controller 307, such as the firmware 304. In some instances, hardware circuits can be used to implement at least some of the functions of the firmware 304. The firmware 304 can be initially stored in non-volatile storage media, such as by using memory 309, or another non-volatile device, and loaded into the volatile DRAM 311 and/or the in-processor cache memory for execution by the controller 307. In one example, the firmware 104 can be configured to control display or other devices of a vehicle based results from an analysis of downloaded event data and associated software.

Figure 8:
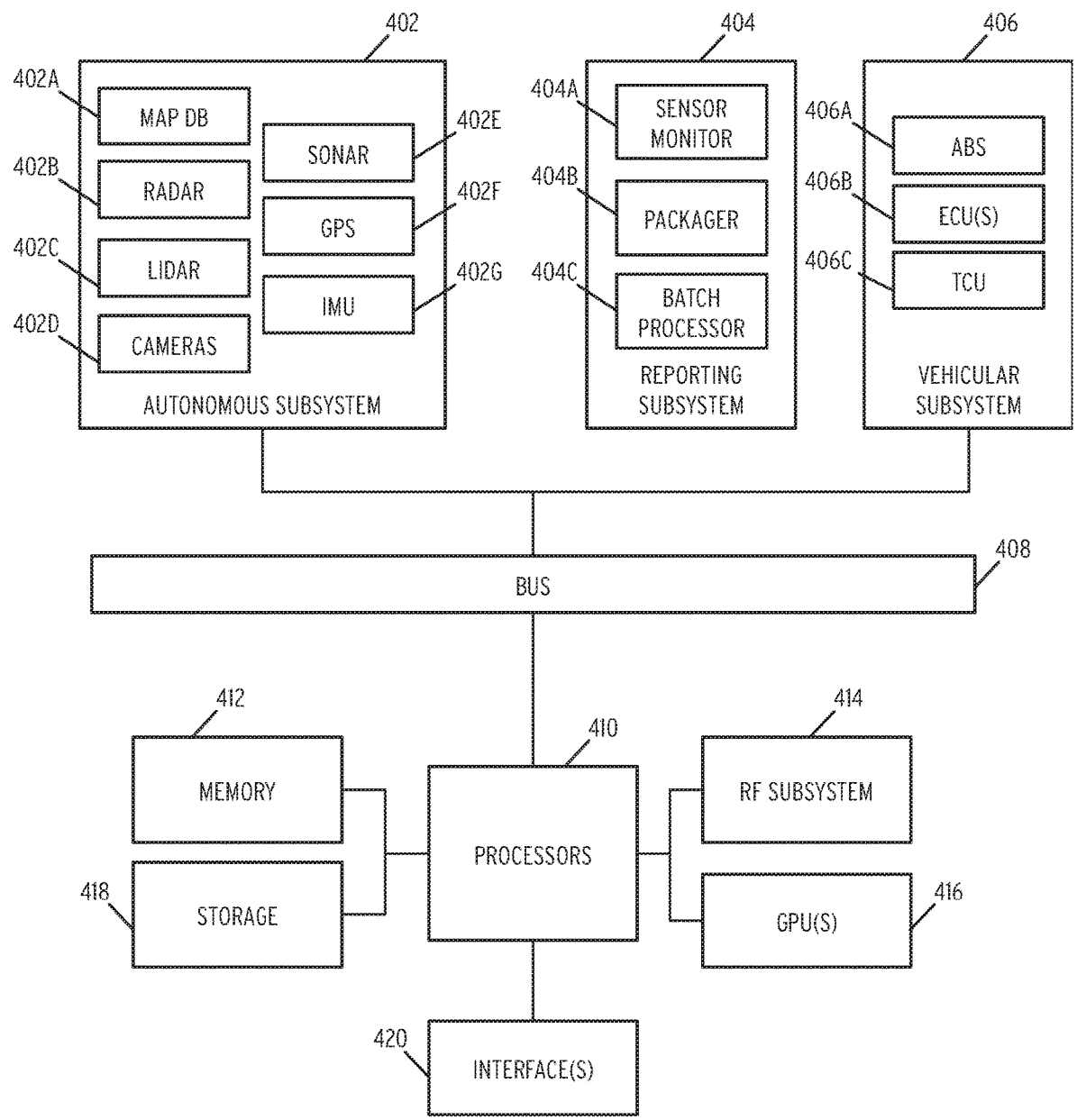
FIG. 8 is a block diagram of an autonomous vehicle including one or more various components and/or subsystems, each of which can be updated in various embodiments to configure the vehicle and/or perform other actions associated with the vehicle.

FIG. 8 is a block diagram of an autonomous vehicle (e.g., vehicle 711) including one or more various components and/or subsystems, each of which can be updated in various embodiments to configure the vehicle and/or perform other actions associated with the vehicle (e.g., configuration and/or other actions performed in response to identifying a fault in software or other stored data such as navigation data). The system illustrated in FIG. 8 may be installed entirely within a vehicle.

The system includes an autonomous vehicle subsystem 402. In the illustrated embodiment, autonomous vehicle subsystem 402 includes map database 402A, radar devices 402B, Lidar devices 402C, digital cameras 402D, sonar devices 402E, GPS receivers 402F, and inertial measurement units 402G. Each of the components of autonomous vehicle subsystem 402 comprise standard components provided in most current autonomous vehicles. In one embodiment, map database 402A stores a plurality of high-definition three-dimensional maps used for routing and navigation. Radar devices 402B, Lidar devices 402C, digital cameras 402D, sonar devices 402E, GPS receivers 402F, and inertial measurement units 402G may comprise various respective devices installed at various positions throughout the autonomous vehicle as known in the art. For example, these devices may be installed along the perimeter of an autonomous vehicle to provide location awareness, collision avoidance, and other standard autonomous vehicle functionality.

Vehicular subsystem 406 is additionally included within the system. Vehicular subsystem 406 includes various anti-lock braking systems 406A, engine control units 402B, and transmission control units 402C. These components may be utilized to control the operation of the autonomous vehicle in response to the streaming data generated by autonomous vehicle subsystem 402A. The standard autonomous vehicle interactions between autonomous vehicle subsystem 402 and vehicular subsystem 406 are generally known in the art and are not described in detail herein.

The processing side of the system includes one or more processors 410, short-term memory 412, an RF system 414, graphics processing units (GPUs) 416, long-term storage 418 and one or more interfaces 420.

The one or more processors 410 may comprise central processing units, FPGAs, or any range of processing devices needed to support the operations of the autonomous vehicle. Memory 412 comprises DRAM or other suitable volatile RAM for temporary storage of data required by processors 410. RF system 414 may comprise a cellular transceiver and/or satellite transceiver. Long-term storage 418 may comprise one or more high-capacity solid-state drives (SSDs). In general, long-term storage 418 may be utilized to store, for example, high-definition maps, routing data, and any other data requiring permanent or semi-permanent storage. GPUs 416 may comprise one more high throughput GPU devices for processing data received from autonomous vehicle subsystem 402A. Finally, interfaces 420 may comprise various display units positioned within the autonomous vehicle (e.g., an in-dash screen).

The system additionally includes a reporting subsystem 404 which performs data collection (e.g., collection of data obtained from sensors of the vehicle that is used to drive the vehicle). The reporting subsystem 404 includes a sensor monitor 404A which is connected to bus 408 and records sensor data transmitted on the bus 408 as well as any log data transmitted on the bus. The reporting subsystem 404 may additionally include one or more endpoints to allow for system components to transmit log data directly to the reporting subsystem 404.

The reporting subsystem 404 additionally includes a packager 404B. In one embodiment, packager 404B retrieves the data from the sensor monitor 404A or endpoints and packages the raw data for transmission to a central system (illustrated in FIG. 9). In some embodiments, packager 404B may be configured to package data at periodic time intervals. Alternatively, or in conjunction with the foregoing, packager 404B may transmit data in real-time and may compress data to facilitate real-time communications with a central system.

The reporting subsystem 404 additionally includes a batch processor 404C. In one embodiment, the batch processor 404C is configured to perform any preprocessing on recorded data prior to transmittal. For example, batch processor 404C may perform compression operations on the data prior to packaging by packager 404B. In another embodiment, batch processor 404C may be configured to filter the recorded data to remove extraneous data prior to packaging or transmittal. In another embodiment, batch processor 404C may be configured to perform data cleaning on the recorded data to conform the raw data to a format suitable for further processing by the central system.

Each of the devices is connected via a bus 408. In one embodiment, the bus 408 may comprise a controller area network (CAN) bus. In some embodiments, other bus types may be used (e.g., a FlexRay or MOST bus). Additionally, each subsystem may include one or more additional busses to handle internal subsystem communications (e.g., LIN busses for lower bandwidth communications).

Figure 9:
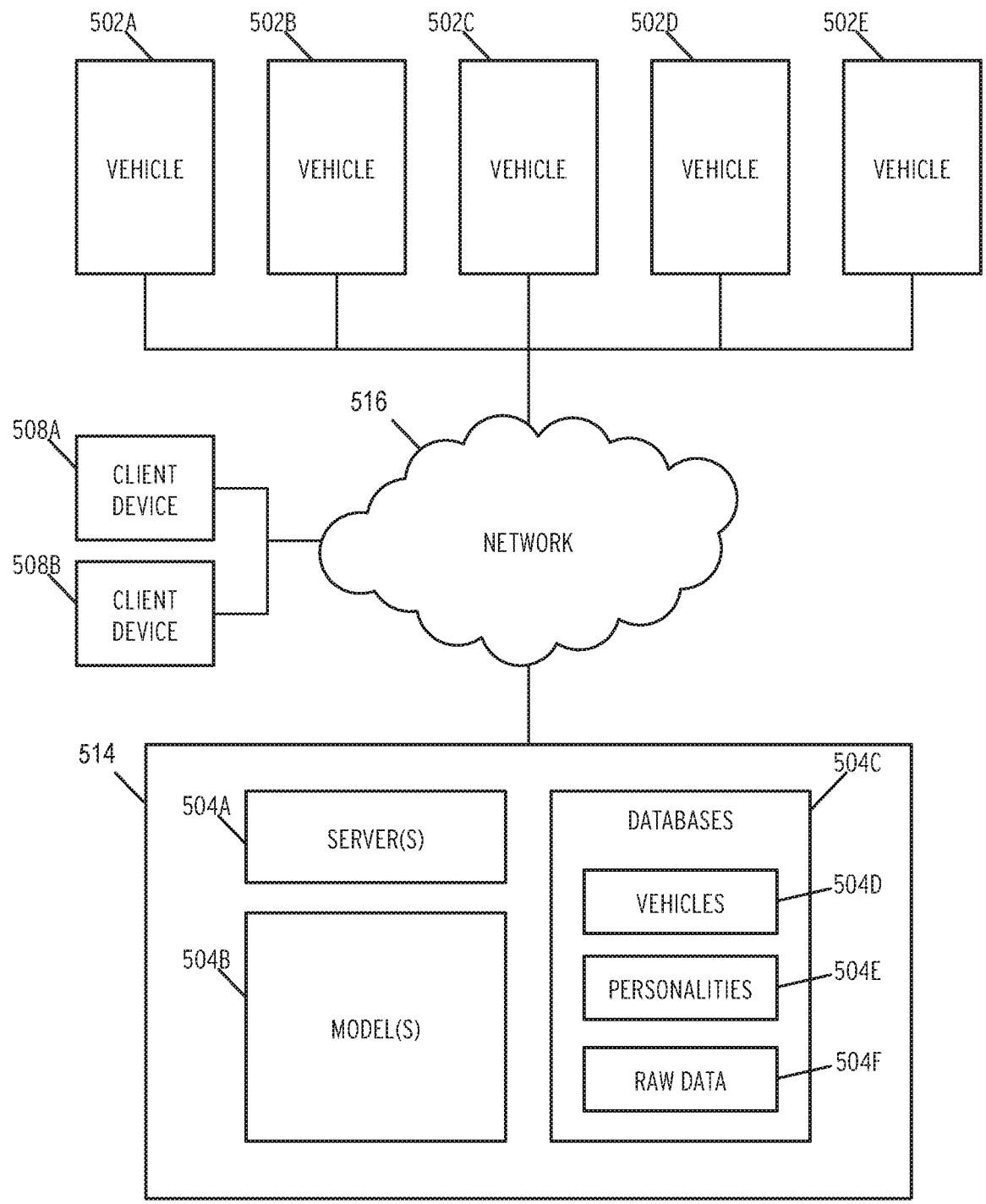
FIG. 9 is a block diagram of a centralized autonomous vehicle operations system, according to various embodiments.

FIG. 9 is a block diagram of a centralized autonomous vehicle operations system, according to various embodiments. As illustrated, the system includes a number of autonomous vehicles 502A-502E. In one embodiment, each autonomous vehicle may comprise an autonomous vehicle such as that depicted in FIG. 8. Each autonomous vehicle 502A-502E may communicate with a central system 514 via a network 516. In one embodiment, network 516 comprises a global network such as the Internet.

In one example, central system 514 is implemented using one or more of servers 101 or 301. In one example, one or more of autonomous vehicles 502A-502E are autonomous vehicle 200 or 711.

The system additionally includes a plurality of client devices 508A, 508B. In the illustrated embodiment, client devices 508A, 508B may comprise any personal computing device (e.g., a laptop, tablet, mobile phone, etc.). Client devices 508A, 508B may issue requests for data from central system 514. In one embodiment, client devices 508A, 508B transmit requests for data to support mobile applications or web page data, as described previously.

In one embodiment, central system 514 includes a plurality of servers 504A. In one embodiment, servers 504A comprise a plurality of front end webservers configured to serve responses to client device 508A, 508B. The servers 504A may additionally include one or more application servers configured to perform various operations to support one or more vehicles.

In one embodiment, central system 514 additionally includes a plurality of models 504B. In one embodiment, models 504B may store one or more neural networks for classifying autonomous vehicle objects. The models 504B may additionally include models for predicting future events. In some embodiments the models 504B may store a combination of neural networks and other machine learning models.

Central system 514 additionally includes one or more databases 504C. The databases 504C may include database record for vehicles 504D, personalities 504E, and raw data 504F. Raw data 504F may comprise an unstructured database for storing raw data received from sensors and logs as discussed previously.

The present disclosure includes methods and apparatuses which perform the methods described above, including data processing systems which perform these methods, and computer readable media containing instructions which when executed on data processing systems cause the systems to perform these methods.

A server and/or a computing device of a vehicle above can be implemented as one or more data processing systems. A typical data processing system may include includes an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a USB (Universal Serial Bus) adapter for controlling USB peripherals, and/or an IEEE-1394 bus adapter for controlling IEEE-1394 peripherals.

The memory may include one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROM), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method for an autonomous vehicle, the method comprising:
    detecting a collision of the vehicle with an object, the detecting comprising receiving first data used for object detection by the vehicle from at least one sensor of the vehicle, and comparing the first data to a threshold, wherein the vehicle comprises at least one computing device that controls the object detection, wherein the at least one computing device includes a controller and system memory, and wherein detecting the collision further comprises analyzing an output from an artificial neural network to identify the object based at least in part on the first data; and
    in response to detecting the collision:
        determining a first portion of the system memory to download;
        detecting a type of event;
        determining a priority based on the type of event; and
        downloading the first data from portions of the system memory to a non-volatile memory device of the vehicle, wherein the downloaded portions include the first portion, and the first data is downloaded portion by portion from the system memory in an order based on the priority.

2. The method of claim 1, further comprising analyzing, by a second computing device, the downloaded first data.

3. The method of claim 2, further comprising:
    extracting, by a third computing device, the downloaded first data from the non-volatile memory device; and
    sending, over a wireless network, the extracted data to the second computing device for analysis.

4. The method of claim 2, wherein analyzing the downloaded first data comprises analyzing a function of software used by the vehicle that is related to object detection.

5. The method of claim 4, wherein the software controls navigation of the vehicle.

6. The method of claim 1, wherein the system memory includes a volatile memory device that stores the first data prior to downloading the first data from the system memory to the non-volatile memory device.

7. The method of claim 1, wherein the output from the artificial neural network classifies the type of event based at least in part on the first data.

8. An autonomous vehicle comprising:
at least one sensor configured to collect sensor data;
a volatile memory device to store data used by software during operation of the vehicle;
a non-volatile memory device configured to receive data from the volatile memory device;
at least one computing device configured to control at least one operation of the vehicle; and
memory storing instructions configured to instruct the at least one computing device to:
detect a collision of the vehicle with an object, wherein detecting the collision comprises analyzing an output from an artificial neural network to identify the object based on at least a portion of the sensor data; and
in response to detecting the collision:
download the sensor data from the volatile memory device to the non-volatile memory device, wherein the sensor data is downloaded in an order based on a priority; and
download program counter data from the volatile memory device to the non-volatile memory device, the program counter data indicating operational state of the software while executing during the collision.

9. The autonomous vehicle of claim 8, wherein downloading the sensor data from the volatile memory device to the non-volatile memory device is completed in less than five seconds after detecting the collision.

10. The autonomous vehicle of claim 8, wherein the sensor data is stored in system memory of the at least one computing device.

11. The autonomous vehicle of claim 8, wherein the volatile memory device is a dynamic random access memory device.

12. The autonomous vehicle of claim 8, wherein the non-volatile memory device is configured to provide the sensor data to a first computing device configured to analyze the sensor data.

13. The autonomous vehicle of claim 8, wherein the at least one computing device includes a first computing device executing the software prior to detecting the collision, and wherein after detecting the collision, the software is analyzed by emulating the collision using the sensor data.

14. A non-transitory computer storage medium storing instructions which, when executed on a computing device, cause the computing device to perform a method for an autonomous vehicle, the method comprising:
detecting a collision of the vehicle with an object, wherein the vehicle comprises at least one computing device configured to use sensor data stored in a volatile memory device for object detection, and wherein detecting the collision comprises analyzing an output from an artificial neural network to identify the object based on the sensor data; and
in response to detecting the collision:
determining a first portion of the volatile memory to download;
detecting a type of event;
determining a priority based on the type of event; and
downloading the sensor data from the first portion of the volatile memory device to a non-volatile memory device in an order based on the priority.

15. The non-transitory computer storage medium of claim 14, wherein the method further comprises analyzing, based on the sensor data, at least one function of software executing on the at least one computing device at the time of detecting the collision.

16. The non-transitory computer storage medium of claim 14, wherein the method further comprises, in response to detecting the collision, selecting a type of data to download, wherein the sensor data comprises data of the selected type.

* * * * *